United States Patent
Walter et al.

(10) Patent No.: US 9,689,431 B2
(45) Date of Patent: Jun. 27, 2017

(54) SEAL ARRANGEMENT HAVING A THROWER RING FOR AN ANTI-FRICTION BEARING

(71) Applicant: Schaeffler Technologies AG & Co. KG, Herzogenaurach (DE)

(72) Inventors: Wilhelm Walter, Dittelbrunn (DE); Erwin Hartmann, Bergrheinfeld (DE); Alexander Happ, Hofheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/911,360

(22) PCT Filed: Jun. 26, 2014

(86) PCT No.: PCT/DE2014/200282
§ 371 (c)(1),
(2) Date: Feb. 10, 2016

(87) PCT Pub. No.: WO2015/028000
PCT Pub. Date: Mar. 5, 2015

(65) Prior Publication Data
US 2016/0186815 A1    Jun. 30, 2016

(30) Foreign Application Priority Data
Aug. 30, 2013   (DE) .......................... 10 2013 217 299

(51) Int. Cl.
*F01D 11/02* (2006.01)
*F16C 33/80* (2006.01)
(Continued)

(52) U.S. Cl.
CPC .......... *F16C 33/805* (2013.01); *F16C 33/783* (2013.01); *F16C 33/7823* (2013.01);
(Continued)

(58) Field of Classification Search
CPC .... F16C 33/805; F16C 33/78; F16C 33/7823; F16C 33/783; F16C 33/7869;
(Continued)

(56) References Cited

U.S. PATENT DOCUMENTS 4,000,664 A * 1/1977 Christensen ........ F16H 25/2204
74/467
5,511,886 A * 4/1996 Sink ........................ B61F 15/22
277/559
(Continued)

FOREIGN PATENT DOCUMENTS

DE   102009052311   5/2011
DE   102010034385   2/2012
(Continued)

OTHER PUBLICATIONS

Sealant—definition by The Free Dictionary.*

*Primary Examiner* — Kristina Fulton
*Assistant Examiner* — Nathan Cumar
(74) *Attorney, Agent, or Firm* — Volpe and Koenig, P.C.

(57) ABSTRACT

A seal arrangement (1) of an anti-friction bearing, which seal arrangement (1) is inserted between a first bearing part (2) and a second bearing part (4). The seal arrangement includes a seal (6) which is positioned on the rotationally fixed first bearing part by a support element (15) which is enclosed at least on one side by an elastic seal material (16), and which seal (6) includes at least one sealing lip (25, 26). A thrower ring (7), forming a collection chamber (13), of the seal arrangement is assigned to the second rotatable bearing part. To this end, a cylindrical portion (9) of the thrower ring is snapped in an end-side circumferential groove (11) by a flange (5) of the second rotatable bearing part. A radial leg (12) of the thrower ring extends such that it maintains a sealing gap (14) to the seat. Moreover, the seal of the seal arrangement includes elastic sealing lips which are sup-
(Continued)

ported on the second bearing part such that they are offset with respect to the thrower ring.

12 Claims, 2 Drawing Sheets

(51) Int. Cl.
  *F16C 33/78* (2006.01)
  *F16C 19/18* (2006.01)
(52) U.S. Cl.
  CPC ...... *F16C 33/7879* (2013.01); *F16C 33/7886* (2013.01); *F16C 33/7896* (2013.01); *F16C 19/184* (2013.01); *F16C 2226/74* (2013.01); *F16C 2300/42* (2013.01); *F16C 2326/02* (2013.01)
(58) Field of Classification Search
  CPC .............. F16C 33/7886; F16C 33/7896; F16C 2226/74; F16C 2326/02; F16C 2300/42
  USPC ................ 277/375–376, 345, 346, 350, 351
  See application file for complete search history.

(56) References Cited

U.S. PATENT DOCUMENTS

| | | | |
|---|---|---|---|
| 8,360,651 B1* | 1/2013 | Fetty | F16C 33/7813 384/459 |
| 2003/0063824 A1* | 4/2003 | Aldridge | B23P 11/005 384/477 |
| 2008/0124017 A1* | 5/2008 | Umekida | F16C 19/187 384/544 |
| 2010/0244388 A1* | 9/2010 | Nakagawa | F16J 15/3264 277/559 |
| 2011/0221140 A1 | 9/2011 | Nakagawa | |
| 2013/0127119 A1 | 5/2013 | Haepp et al. | |

FOREIGN PATENT DOCUMENTS

| | | | |
|---|---|---|---|
| JP | 2003056577 | | 2/2003 |
| JP | 2009197884 A | * | 9/2009 |

* cited by examiner

US 9,689,431 B2

SEAL ARRANGEMENT HAVING A THROWER RING FOR AN ANTI-FRICTION BEARING

BACKGROUND

The invention relates to a seal arrangement of an anti-friction bearing that is inserted between a first bearing part and a second bearing part. The construction comprises a seal that encloses a support element surrounded on one side by an elastic sealant and also at least one sealing lip. The seal is positioned via the support element on the rotationally fixed first bearing part. The seal arrangement also encloses a thrower ring that is constructed as an angled ring and forms a collection chamber and is allocated to the second rotating bearing part, wherein a radial section of the thrower ring formed as a flange has a profile maintaining a sealing gap relative to the seal.

Seal arrangements with rubbing seal contacts of sealing lips are typically used for sealing anti-friction bearings, wherein the bearing parts to be sealed are opposite each other, in particular, in the radial direction. Such installation situations are known from various applications in automobile and machine construction, for example, in wheel bearings for passenger cars or commercial vehicles.

Similarly to anti-friction bearings, for wheel bearings constructed as angled contact ball bearings or conical roller bearings, an effective axial sealing of the rolling space, the interior filled with lubricant and containing rolling bodies, must be provided. For this purpose, it is known to use seal arrangements that enclose a thrower ring that is produced from sheet metal and forms a sealing gap with an end-side contour of the wheel bearing. Such seal arrangements also include sealing lips interacting with the rotating thrower ring.

From DE 10 2009 052 311 A1, a wheel bearing unit is known whose flange-side thrower ring forms axial surfaces for a rubbing seal contact of two axial sealing lips. The fastening area of the thrower ring forms, on the wheel flange side, in a transition area, a section extending radially. JP 2003 056 577 A discloses a wheel bearing arrangement in which an outer bearing ring forms a first bearing part that is sealed relative to the wheel flange, the second bearing part. For this purpose, a contact plate is provided that contacts the wheel hub or the wheel flange both axially and also radially and on which rubbing seal contacts are formed by an axial and a radial sealing lip. The sealing lips are here allocated to a support element attached on an inner side of the outer bearing ring.

SUMMARY

The objective of the invention is to create a friction-optimized and packaging space-optimized, as well as economical, seal arrangement with which a compact bearing improving the component stiffness can also be realized.

This objective is achieved by a seal arrangement with one or more features of the invention. Advantageous refinements of the invention are described below.

According to the invention, the seal arrangement comprises a thrower ring that is allocated to a radial zone, a flange of the second rotating bearing part, and is snapped over a cylindrical section into an end-side circumferential groove of a radially oriented flange of the second bearing part and in this way fixed in position. An end-side, radially oriented leg of the thrower ring has a profile in the installed condition for forming a collection chamber with an axial distance to the radial flange of the second bearing part. Furthermore, the seal arrangement encloses a seal that is fixed in position on the stationary bearing part and whose elastic sealing lips are supported offset to the thrower ring on the second rotating bearing part. These sealing lips are formed from an elastic seal material, in particular, an elastomer that simultaneously surrounds the support element of the seal fixed on the rotationally locked first bearing part on one side. Due to the structural design according to the invention, in which the sealing lips are supported directly on the rotating bearing part and not on the thrower ring, in comparison with previously known solutions, a non-corroding thrower ring can be advantageously eliminated. Due to the deviating sealing lip arrangement, the thrower ring also requires no sealing material for sealing a sealing gap between the flange or the rotating bearing part and the thrower ring, which produces another cost advantage. The invention also advantageously provides the possibility of increasing a transition radius between the radially oriented flange and the axial section of the rotating second bearing part, which can improve the component stiffness of the rotating second bearing part. In this way, a compact and robust bearing construction can be realized. Through the invention, both the service life and also the sealing performance of a seal arrangement based on sealing lips and a thrower ring can be increased without negative effects compared with known conventional seal arrangements.

A preferred construction of the invention provides uses a thrower ring that is made from a metallic material and is fixed in position by an elastic fastener in the circumferential groove of the second rotating bearing part. A suitable construction for this is, for example, a thrower ring that is made from a steel sheet and whose surfaces are treated or coated and forms a cylindrical sleeve that connects on one side to a radial leg or flange. A thrower ring made completely from stainless steel could also be used. Alternatively, a thrower ring made from plastic could be used or a thrower ring that comprises a sheet ring or a cylindrical steel sleeve on which a leg made from plastic is molded. As a fastener, preferably a rubber or plastic bead is provided that is fastened, for example, with a material fit, in particular, by means of vulcanization or adhesion, on the thrower ring and is snapped in the installed condition with a positive and non-positive fit in the circumferential groove of the flange of the second bearing part. The invention also offers the possibility of fastening the thrower ring using holding tabs in the circumferential groove, wherein these tabs are provided, for example, partially around the cylindrical section of the thrower ring.

The seal arrangement according to the invention also has a seal that forms, on one end, radially offset to the sealing lips, a receptacle limited by two axially projecting, height-offset moldings formed from elastic seal material. In this receptacle, the radial leg or flange of the thrower ring engages for forming a sealing labyrinth with play. Here, the inner molding has a circumferential rim that is oriented radially in the direction of the thrower ring and forms a collection channel that extends to the collection chamber of the thrower ring.

The sealing labyrinth formed by the seal and the thrower ring encloses a defined entry gap. For this purpose, the flange, the radial section of the thrower ring, is bent at the end in the direction of the second bearing part, wherein the angled bend corresponds to an inner bent contour of the outer molding of the seal receptacle.

Another advantageous structural construction of the invention provides that the seal has extended elastic sealing lips that are supported offset to the thrower ring on the rotating second bearing part. Preferably, a sealing lip is supported on a cylindrical section and another elastic sealing lip is supported on a radially oriented section, the flange of the second bearing part.

To guarantee a durable joint of the seal, the support element or the reinforcement of the seal encloses an end section of the first bearing part with an angled leg or a cylindrical sleeve section in a non-positive fit on the outer side. In this way, a position-fixed installed condition of the support element and thus the seal is produced relative to the first bearing part also to be designated as an outer bearing ring. Here, the angled leg of the support element forming a sleeve section is enclosed completely by the elastic sealant. Alternatively, for the durable fixing according to the invention, the support element with an angled leg could form a contact on the inner side of the first bearing part with a non-positive fit, wherein additionally a static seal connected to the support element forms a sealing contact on the inside on the first bearing part.

According to a preferred construction, a radial section of the support element or the reinforcement of the seal extends up to the sealing lips. This measure has the effect of improved support of the extended sealing lips supported with a non-positive fit on the second bearing part.

The seal arrangement according to the invention is preferably usable for the wheel bearing of vehicles. The collection bowl formed by the thrower ring effectively stops the penetration of contaminants into the wheel bearing. On the other hand, the elastic sealing lips of the seal prevent a lubricant discharge from the wheel bearing constructed as an anti-friction bearing.

BRIEF DESCRIPTION OF THE DRAWINGS

Additional details and improvements of the invention are given from the following figure descriptions. The invention is not limited to these embodiments. Shown herein are.

DETAILED DESCRIPTION OF THE PREFERRED EMBODIMENTS

Figure 1:
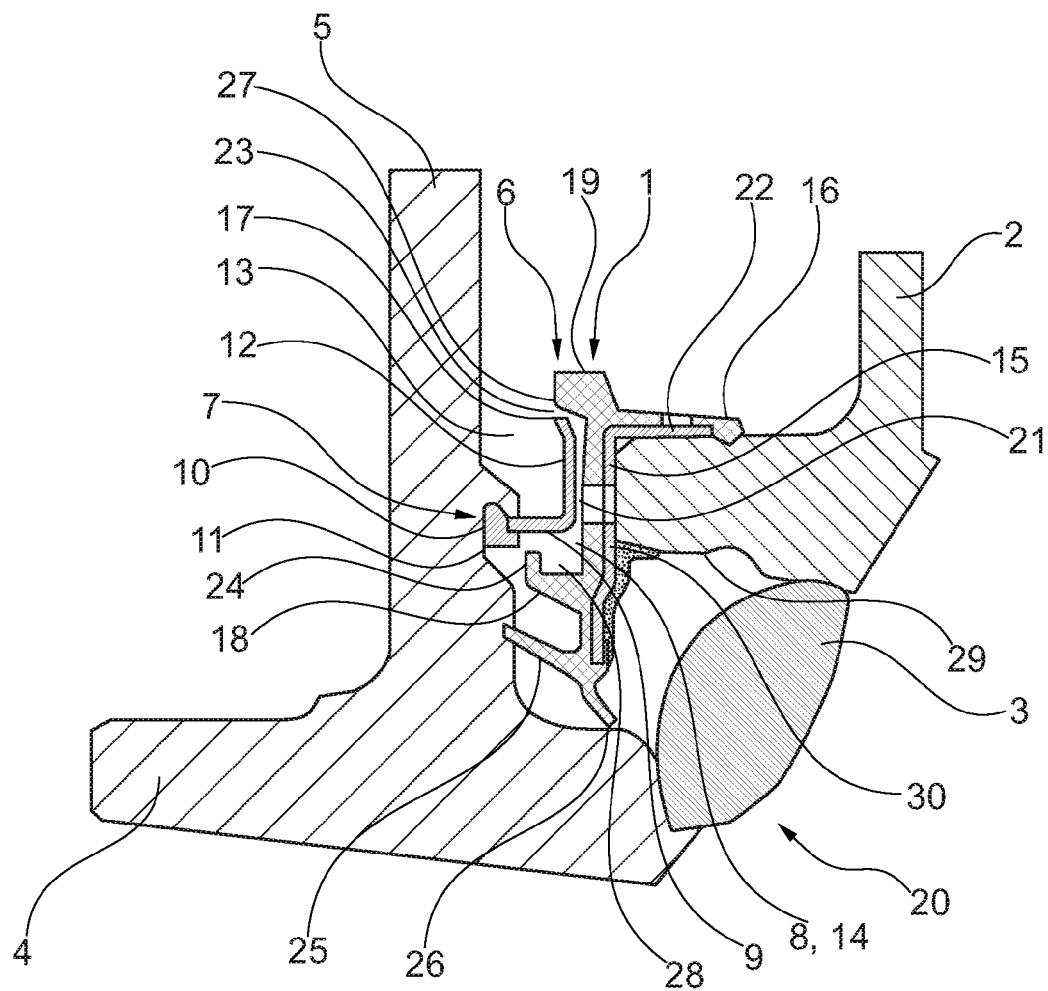
FIG. 1 a first embodiment of a seal arrangement according to the invention.

FIG. 1 shows a seal arrangement 1 of a wheel bearing 20 formed as an anti-friction bearing, of which a section is shown. The wheel bearing 20 includes a first bearing part 2, an outer, stationary bearing ring that is connected in an installed condition to a wheel carrier (not shown). Roller bodies 3 are guided on the outside on the bearing part 2 and on the inside on a second bearing part 4 that is connected integrally with a flange 5 oriented radially. The wheel flange-side seal arrangement 1 comprises a seal 6 allocated to the first bearing part 2 and, as a frictionless pre-seal, a thrower ring 7 that is snapped on the flange 5 of the second bearing part 4 and in this way fixed in position. The thrower ring 7 forming a sealing labyrinth 8 with the seal 6 is formed as an angled ring, wherein a cylindrical section 9 is fixed by a fastener 10 in an end-side circumferential groove 11 of the flange 5. On the seal side, the thrower ring 7 has an all-around, radial leg 12 that defines a collection chamber 13 together with the flange 5. The leg 12 is guided up to the seal 6 while maintaining a sealing gap 14 and forms on one side an angled bend 17 pointing toward the flange 5. The seal 6 is fastened by a support element 15 also called reinforcement on the first bearing part 2 in that a sleeve section 22 of the support element 15 is pressed onto an end area of the bearing part 2. The support element 15 is enclosed in some areas by an elastic seal material 16 that has, on the flange side, two radially spaced, axial moldings 18, 19 formed from seal material 16. The seal material 16 also forms a static sealing lip 30 that forms a sealing contact on an inner side 29 of the first bearing part 2. The leg 12 of the thrower ring 7 engages in the moldings 18, 19 defining a receptacle 21 with play for forming the sealing labyrinth 8. An input gap 23 of the receptacle 21 is defined by the angled bend 17 of the thrower ring 7 and an inner inclined contour 27 of the outer molding 19. Alternatively, the input gap 23 can be formed by a straight end of the leg 12 of the thrower ring 7 and the contour 27 of the outer molding 19. For forming a collection channel 28, the inner molding 18 encloses, on the end, a rim 24 oriented in the direction of the thrower ring 7. The seal 6 also includes two elastic, extended sealing lips 25, 26, wherein the sealing lip 25 is allocated to a radially oriented section, the flange 5, and the sealing lip 26 is allocated to a cylindrical section of the second bearing part 4. In summary, the invention relates to a seal arrangement 1 in which both water and also particles of foreign matter can be deflected in the radial direction by the thrower ring 7 during driving operation and thus can be kept away from the input gap 23 of the sealing labyrinth 8.

Figure 2:
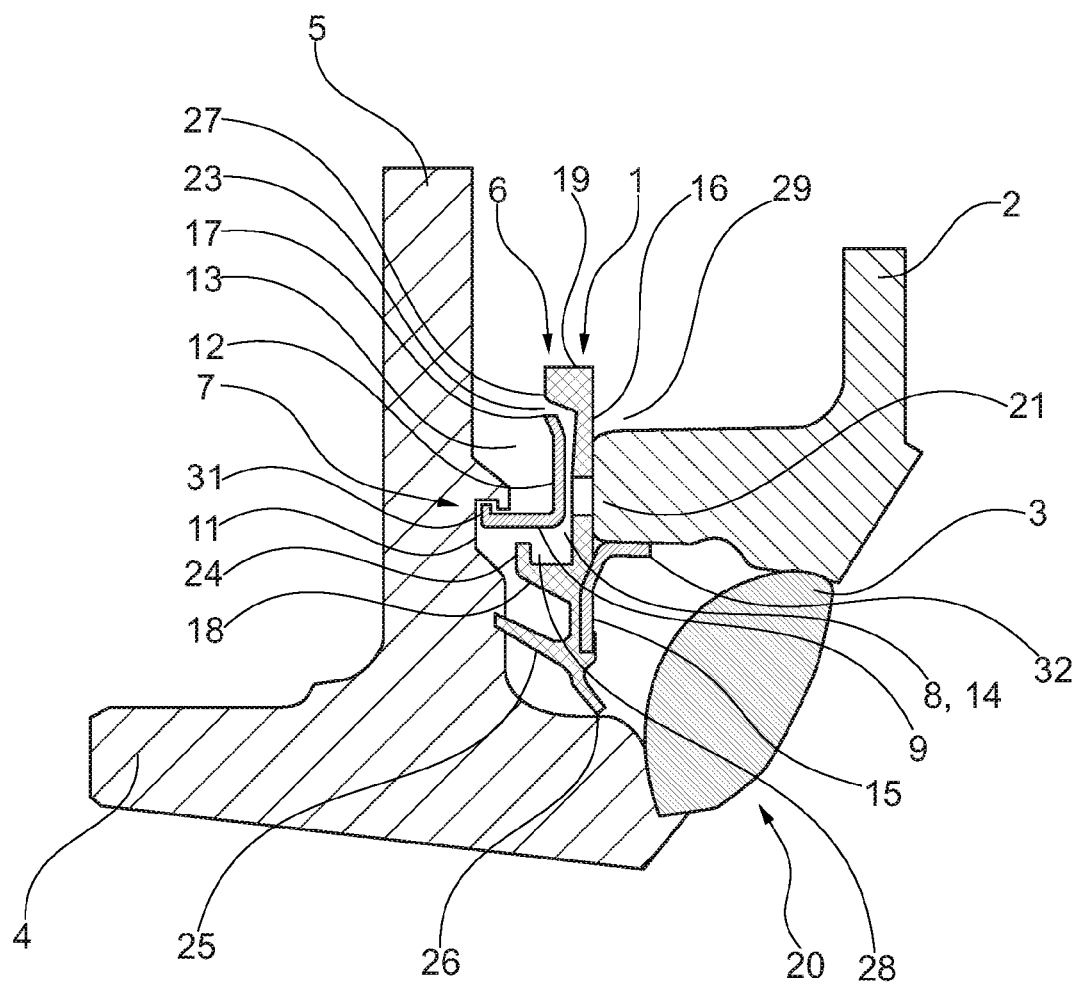
FIG. 2 a second embodiment of a seal arrangement according to the invention.

FIG. 2 shows a fastening of the seal 6 and the thrower ring 7 deviating from FIG. 1. Similar or identical parts are provided in FIG. 2 with reference symbols matching those in FIG. 1. For fixing the position of the seal 6, the support element 15 forms an angled leg 32 that forms a non-positive contact on the inner side 29 of the first bearing part 2. FIG. 2 also shows a fastening of the thrower ring 7 that is an alternative to FIG. 1 by means of holding tabs 31. The holding tabs 31 arranged in the projection of the cylindrical section 9 of the thrower ring 7 preferably engage in the circumferential groove 11 forming an undercut. The retaining tabs 31 preferably have a multiple-part construction or are positioned partially around the cylindrical section 9 of the thrower ring 7.

LIST OF REFERENCE NUMBERS

1 Seal arrangement
2 Bearing part (first)
3 Roller body
4 Bearing part (second)
5 Flange
6 Seal
7 Thrower ring
8 Sealing labyrinth
9 Section
10 Fastener
11 Circumferential groove
12 Leg
13 Collection chamber
14 Sealing gap
15 Support element
16 Seal material
17 Angled bend
18 Molding
19 Molding
20 Wheel bearing
21 Receptacle
22 Sleeve section
23 Input gap
24 Rim 25 Sealing lip
26 Sealing lip
27 Contour
28 Collection channel
29 Inner side
30 Sealing lip
31 Holding tab
32 Leg

The invention claimed is:

1. A seal arrangement of an anti-friction bearing the seal arrangement comprising a seal that is positioned with a support element enclosed at least on one side by an elastic seal on a rotationally fixed first bearing part, a thrower ring forming a collection chamber allocated to a second rotating bearing part, the thrower ring including a radial leg with a profile maintaining a sealing gap to the seal, the thrower ring is allocated to a radial flange of the second rotating bearing part and is snapped with a cylindrical section in an axially extending protrusion formed on an end-side of a circumferential groove of the radial flange and elastic sealing lips extend from the seal and are supported offset to the thrower ring on the second bearing part, and the thrower ring engages a radially inner surface of the axially extending protrusion of the radial flange of the second rotating bearing part.

2. The seal arrangement according to claim 1, wherein the thrower ring is made from a metallic material or a plastic and is fixed in position by an elastic fastener or by holding tabs in the circumferential groove of the second bearing part.

3. The seal arrangement according to claim 1, wherein the thrower ring comprises a sheet metal ring or a cylindrical sleeve on which the leg that is made from plastic is molded.

4. The seal arrangement according to claim 1, wherein the thrower ring is constructed as one part and made from a plastic and is fixed in position in the circumferential groove of the second bearing part.

5. The seal arrangement according to claim 1, wherein the seal forms a receptacle that is defined by two moldings that are offset from each other radially and are formed from the elastic seal and in which the leg of the thrower ring forms a sealing labyrinth and the elastic seal forms a static sealing lip that is supported on an inner side of the first bearing ring.

6. The seal arrangement according to claim 5, wherein the leg of the thrower ring includes, on an end side, an angled bend that is directed in a direction of the flange of the second bearing part and defines, with an inner inclined contour of the outer molding, an input gap.

7. The seal arrangement according to claim 1, wherein the elastic sealing lips of the seal have an extended construction, and one of the sealing lips is supported on a cylindrical section and the other sealing lip is supported on a radial flange of the second bearing part.

8. The seal arrangement according to claim 1, wherein for fixing a position of the seal, the support element includes a cylindrical sleeve section that encloses the first bearing part.

9. The seal arrangement according to claim 1, wherein the support element has a radial section that is guided up to the sealing lips.

10. The seal arrangement according to claim 1, wherein the anti-friction bearing is a wheel bearing, the seal is allocated to an outer stationary bearing ring that forms the first rotationally fixed bearing part, and the thrower ring is allocated to the radial flange connected integrally to an inner bearing ring that forms the second rotating bearing part.

11. The seal arrangement according to claim 1, wherein for fixing a position of the seal, the support element forms a contact on an inner side of the first bearing part for fixing a position with an angled leg.

12. The seal arrangement according to claim 1, wherein the axially extending protrusion of the radial flange of the second rotating bearing part includes a radially outward groove and a radially inward flange defining a pocket.

* * * * *